US012090757B2

(12) United States Patent
Huang et al.

(10) Patent No.: US 12,090,757 B2
(45) Date of Patent: Sep. 17, 2024

(54) HEATER DEVICE WITH MEMORY UNIT AND OPERATION METHOD THEREOF

(71) Applicant: InnoLux Corporation, Miao-Li County (TW)

(72) Inventors: Po-Han Huang, Miao-Li County (TW); Tao-Sheng Chang, Miao-Li County (TW); Te-Yu Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 73 days.

(21) Appl. No.: 17/820,967

(22) Filed: Aug. 19, 2022

(65) Prior Publication Data

US 2023/0098704 A1 Mar. 30, 2023

(30) Foreign Application Priority Data

Sep. 30, 2021 (CN) .......................... 202111158619.1

(51) Int. Cl.
*B41J 2/045* (2006.01)
*B41J 2/14* (2006.01)

(52) U.S. Cl.
CPC ......... *B41J 2/1412* (2013.01); *B41J 2/04538* (2013.01)

(58) Field of Classification Search
CPC ..... B41J 2/04541; B41J 2/0455; B41J 2/0458
See application file for complete search history.

(56) References Cited

U.S. PATENT DOCUMENTS 7,448,730 B2 11/2008 Hirayama
9,336,895 B2 5/2016 Yanagisawa et al.
10,297,322 B2 5/2019 Yamazaki et al.
2006/0007258 A1 1/2006 Jacobsen et al.
2012/0256293 A1 10/2012 Lin et al.
2016/0163720 A1 6/2016 Abe et al.
2017/0291415 A1* 10/2017 Matsumoto ......... H01L 27/0281
2018/0050901 A1* 2/2018 Neo ........................ B05B 17/06
2021/0354444 A1* 11/2021 Ng ........................ B41J 2/04541
2022/0288923 A1* 9/2022 Hirobe ................. B41J 2/04563
2023/0317186 A1* 10/2023 Shimoyama ......... B41J 2/04581 365/96

FOREIGN PATENT DOCUMENTS

EP 3758941 A1 * 1/2021 ................ B41J 2/01
TW 200523122 A 7/2005
TW 201351568 A 12/2013
TW 202040756 A 11/2020

OTHER PUBLICATIONS

Chinese language office action dated Sep. 27, 2022, issued in application No. TW 111119662.

* cited by examiner

*Primary Examiner* — Julian D Huffman
(74) *Attorney, Agent, or Firm* — McClure, Qualey & Rodack, LLP

(57) ABSTRACT

A heater device with a memory unit includes a first transistor, a second transistor, a memory unit and a heater. The first terminal of the second transistor and the first terminal of the first transistor are electrically connected to each other. The memory unit is electrically connected to the second terminal of the first transistor. The heater is electrically connected to the second terminal of the second transistor.

10 Claims, 6 Drawing Sheets

HEATER DEVICE WITH MEMORY UNIT AND OPERATION METHOD THEREOF

CROSS REFERENCE TO RELATED APPLICATIONS

This application claims priority of China Patent Application No. 202111158619.1, filed on Sep. 30, 2021, the entirety of which is incorporated by reference herein.

BACKGROUND OF THE DISCLOSURE

Field of the Disclosure

The disclosure relates to a heater device, and in particular, to a heater device with a memory unit and an operation method thereof.

Description of the Related Art

Conventional printer devices may use a heater control circuit to heat the heater of the inkjet head, so that the inkjet head may eject the desired pattern. However, if the printer device needs to add functions, such as memory blocks, it may increase the number of signals, pins, circuit usage area, cost, and so on. Therefore, a new design for a circuit structure is needed to solve the problem described above.

BRIEF SUMMARY OF THE DISCLOSURE

An embodiment of the disclosure provides a heater device with a memory unit, which includes a first transistor, a second transistor, a memory unit and a heater. The first terminal of the second transistor and the first terminal of the first transistor are electrically connected to each other. The memory unit is electrically connected to the second terminal of the first transistor. The heater is electrically connected to the second terminal of the second transistor.

An embodiment of the disclosure provides an operation method of a heater device with a memory unit. The heater device has a burning mode, a reading mode and a heating mode. The heater device includes a plurality of heater circuits. Each of the heater circuits includes a first transistor and a second transistor, and a memory unit and a heater respectively electrically connected to the first transistor and the second transistor. The method includes the follow steps. In the burning mode, at least one of the first transistors is selectively turned on according to a first signal, so that a first current generated by voltage signals coupled to two terminals of the first transistor passes through the memory unit. In the reading mode, the first transistors are sequentially turned on to determine states of the memory units. In the heating mode, at least one of the second transistors is selectively turned on according to a second signal, so that a second current generated by voltage signals coupled to two terminals of the second transistor passes through the heater.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
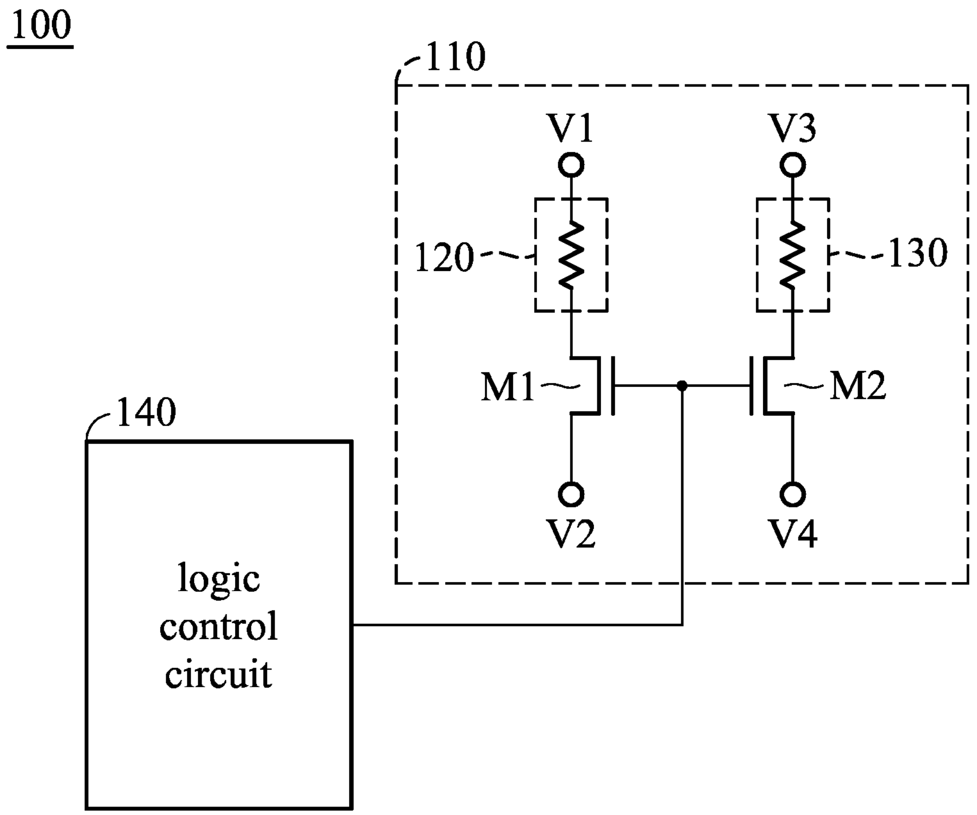
FIG. 1 is a schematic view of a heater device with a memory unit according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as "first", "second", etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

The "including" mentioned in the entire specification and claims is an open term, so it should be interpreted as "including or comprising but not limited to".

Furthermore, "connected or "coupled" herein includes any direct and indirect connection means. Therefore, an element or layer is referred to as being "connected to" or "coupled to" another element or layer, the element or layer can be directly on, connected or coupled to another element or layer or intervening elements or layers may be present. When an element is referred to as being "directly connected to" or "directly coupled to" another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

FIG. 1 is a schematic view of a heater device with a memory unit according to an embodiment of the disclosure.

In the embodiment, the heater device 100 with the memory unit may be disposed on a silicon (Si) wafer substrate, a glass substrate or a polyimide (PI) substrate, but the disclosure is not limited thereto. Please refer to FIG. 1. The heater device 100 with the memory unit includes a heater circuit 110, and the heater circuit 110 may at least include a transistor M1, a second transistor M2, a memory unit 120 and a heater 130.

The first terminal of the transistor M2 and the first terminal of the transistor M1 may be electrically connected to each other. The memory unit 120 may be electrically connected to a second terminal of the transistor M1. The heater 130 may be electrically connected to a second terminal of the transistor M2.

In the embodiment, the transistor M1 is, for example, an N-type transistor, but the disclosure is not limited thereto. The first terminal of the transistor M1 may be a gate terminal, the second terminal of the transistor M1 (i.e., the second terminal of the transistor M1 electrically connected to the memory unit 120) may be a drain terminal, and a third terminal of the transistor M1 may be a source terminal. In addition, the second terminal (such as the drain terminal) of the transistor M1 may receive a reference voltage signal V1 (such as a high voltage signal) through the memory unit 120, and the third terminal (such as the source terminal) of the transistor M1 may receive a reference voltage signal V2 (such as a low voltage signal). In some embodiments, the transistor M1 may also be a P-type transistor.

In the embodiment, the transistor M1 and the transistor M2 may be transistors with the same doping type. That is, the transistor M2 may also be an N-type transistor, but the disclosure is not limited thereto. The first terminal of the transistor M2 may be a gate terminal, the second terminal of the transistor M2 (i.e., the second terminal of the transistor M2 electrically connected to the heater 130) may be a drain terminal, and a third terminal of the transistor M2 may be a source terminal. In addition, the second terminal (such as the drain terminal) of the transistor M2 may receive a reference voltage signal V3 (such as the high voltage signal) through the heater 130, and the third terminal (such as the source terminal) of the transistor M2 may receive a reference voltage signal V4 (such as the low voltage signal). In some embodiment, the transistor M2 may also be a P-type transistor.

In some embodiment, the memory unit 120 is, for example, a fuse, but the disclosure is not limited thereto. When the current flows through the memory unit 120, the heater circuit 110 may perform a burning operation, so as to burn the memory unit 120 to present an open circuit. In addition, when no current flows through the memory unit 120, the heater circuit 110 may not perform the burning operation, so that the memory unit 120 presents a non-open circuit. Furthermore, the material of the memory unit 120 is, for example, indium tin oxide (ITO), polysilicon, aluminum (Al), copper (Cu), nickel (Ni), molybdenum (Mo), indium zinc oxide (IZO), but the disclosure is not limited thereto.

In some embodiment, the heater 130 may be a resistor or another suitable heating element, but the disclosure is not limited thereto. When the current flows through the heater 130, the heater circuit 110 may perform a heating operation, so that the inkjet head corresponding to the position performs an inkjet operation (for example, the desired pattern is ejected). When no current flows through the heater 130, the heater circuit 110 may not perform the heating operation.

Furthermore, the heater device 100 further includes a logic control circuit 140. The logic control circuit 140 may be electrically connected to the first terminal of the transistor M1 and the first terminal of the transistor M2. In addition, the heater device 100 may further include a control circuit (not shown) and a power source circuit (not shown). The control circuit may be electrically connected to the terminal of the reference voltage signal V1 and the logic control circuit 140, The power source circuit may be electrically connected to the terminal of the reference voltage signal V2, the terminal of the reference voltage signal V3, the terminal of the reference voltage signal V4 and the control circuit, and the control circuit may control the power source circuit, so that the power source circuit provides the reference voltage signal V2, the reference voltage signal V3 and the reference voltage signal V4. In the embodiment, the control circuit may be, for example, a micro controller unit (MCU), and the power source circuit is, for example, a power supply chip, but the disclosure is not limited thereto.

In the embodiment, the heater device 100 may include a burning mode, a reading mode and a heating mode, but the disclosure is not limited thereto. In the operation of the heater device 100, in the burning mode, the logic control circuit 140 may generate a first signal (such as the high voltage signal) to the first terminal (such as the gate terminal) of the transistor M1 to turn on the transistor M1, and the control circuit may provide the reference voltage signal V1 and control the power source circuit to provide the reference voltage signal V2, so that the current generated by the voltage signals (such as the reference voltage signal V1 and the reference voltage signal V2) coupled to the two terminals of the transistor M1 flows through the memory unit 120, so as to perform the burning operation on the memory unit 120. For example, the memory unit 120 is burned to present the open circuit. On the other hand, when the logic control circuit 140 does not generate the first signal (such the high voltage signal) to the first terminal (such as the gate terminal) of the transistor M1, the transistor M1 may be turned off, no current flows through the memory unit 120, and the burning operation may not be performed on the memory unit 120, so that the memory unit 120 presents the non-open circuit.

In addition, in the burning mode, the control circuit may also selectively disconnect the voltage signals coupled to the two terminals of the transistor M2. That is, the control circuit may control the power source circuit to stop providing the reference voltage signal V3 and the reference voltage signal V4, so that no current flows through the heater 130, and the heater circuit 110 may not perform the heating operation. Therefore, the power consumption of the heater device 100 may be reduced.

Then, in the reading mode, the logic control circuit 140 controls to turn on (conduct) the transistor M1, so that the control circuit determines the state of the memory unit 120. That is, when the logic control circuit 140 controls to turn on the transistor M1, the control circuit may stop providing the reference voltage signal V1, and the control circuit may read the memory unit 120 through the terminal of the reference voltage signal V1 and determine that the state of the memory unit 120 is the open circuit or the non-open circuit according to the reading result. In some embodiments, the open circuit is represented, for example, as "0", and the non-open circuit is represented, for example, as "1", but the disclosure is not limited thereto. In other embodiments, the open circuit is represented, for example, as "1", and the non-open circuit is represented, for example, as "0". Accordingly, the reading result of the control circuit may be "0" or "1", and the reading result may be used as an identification code of the inkjet head of the printer device, preventing the printer device from downgrading to the old firmware or software, or a batch identification of product parameters. Therefore, the heater device 100 may have the memory function, so as to increase the convenience of use.

In addition, in the reading mode, the control circuit may also selectively disconnect the voltage signals coupled to the two terminals of the transistor M2. That is, the control circuit may control the power source circuit to stop providing the reference voltage signal V3 and the reference voltage signal V4, so that no current flows through the heater 130, and the heater circuit 110 may not perform the heating operation. Therefore, the power consumption of the heater device 100 may be reduced.

Afterward, in the heating mode, the logic control circuit 140 may generate a second signal (such as the high voltage signal) to the first terminal (such as the gate terminal) of the transistor M2 to turn on the transistor M2, and the control circuit may control the power source circuit to provide the reference voltage signal V3 and the reference voltage signal V4, so that the current generated by the voltage signals (such as the reference voltage signal V3 and the reference voltage signal V4) coupled to the two terminals of the transistor M2 flows through the heater 130, so that the heater circuit 110 performs the heating operation. On the other hand, when the logic control circuit 140 does not generate the second signal (such as the high voltage signal) to the first terminal (such as the gate terminal) of the transistor M2, the transistor M2 may be turned off, no current flows through the heater 130, and the heater circuit 110 may not perform the heating operation.

In addition, in the heating mode, the control circuit may also selectively disconnect the voltage signals coupled to the two terminals of the transistor M1. That is, the control circuit may stop providing the reference voltage signal V1 and control the power source to stop providing the reference voltage signal V2, so as to reduce the power consumption of the heater device 100.

In the embodiment, the first terminal of the transistor M1 and the first terminal of the transistor M2 are electrically connected to each other and receive the same signal, but the disclosure is not limited thereto. In some embodiments, the first terminal of the transistor M1 and the first terminal of the transistor M2 may be separated and receive different signals, and the same effect as a memory function may also be achieved.

Figure 2:
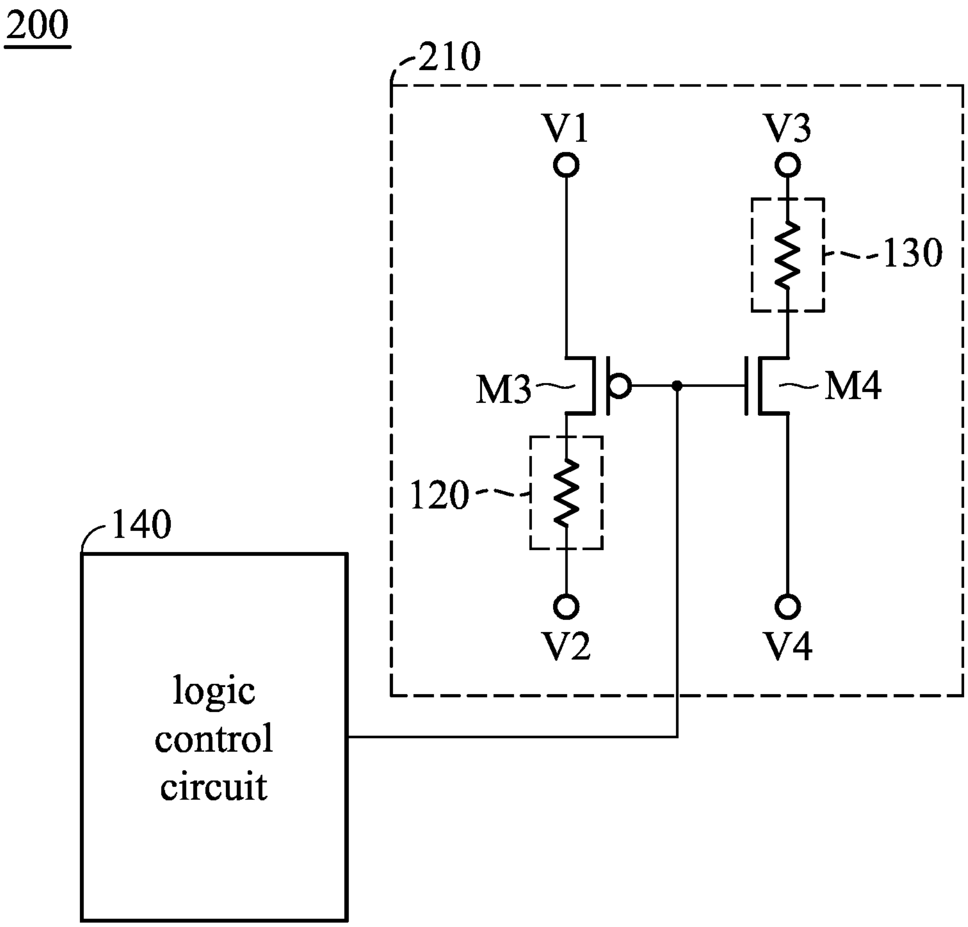
FIG. 2 is a schematic view of a heater device with a memory unit according to an embodiment of the disclosure.

FIG. 2 is a schematic view of a heater device with a memory unit according to an embodiment of the disclosure. Please refer to FIG. 2. The heater device 200 with the memory unit includes a heater circuit 210, and the heater circuit 210 may at least include a transistor M3, a transistor M4, a memory unit 120 and heater 130. In the embodiment, the memory unit 120 and heater 130 in FIG. 2 are the same as or similar to the memory unit 120 and the heater 130 in FIG. 1. Accordingly, the memory unit 120 and the heater 130 in FIG. 2 may refer to the description of the embodiment of FIG. 1, and the description thereof is not limited thereto.

The first terminal of the transistor M4 and the first terminal of the transistor M3 may be electrically connected to each other. The memory unit 120 may be electrically connected to a second terminal of the transistor M3. The heater 130 may be electrically connected to a second terminal of the transistor M4.

In the embodiment, the transistor M3 may be a P-type transistor, but the disclosure is not limited thereto. The first terminal of the transistor M3 may be a gate terminal, the second terminal of the transistor M3 (i.e., the second terminal of the transistor M3 electrically connected to the memory unit 120) may be a drain terminal, and a third terminal of the transistor M3 may be a source terminal. In addition, the second terminal (such as the drain terminal) of the transistor M3 may receive the reference voltage signal V2 (such as the low voltage signal) through the memory unit 120, and the third terminal (such as the source terminal) of the transistor M3 may receive the reference voltage signal V1 (such as the high voltage signal). In some embodiments, the transistor M3 may also be an N-type transistor.

In the embodiment, the transistor M3 and the transistor M4 may be transistors with different doping types. That is, the transistor M4 may be an N-type transistor, but the disclosure is not limited thereto. The first terminal of the transistor M4 may be a gate terminal, the second terminal of the transistor M4 (i.e., the second terminal of the transistor M4 electrically connected to the heater 130) may be a drain terminal, and a third terminal of the transistor M4 may be a source terminal. In addition, the second terminal (such as the drain terminal) of the transistor M4 may receive the reference voltage signal V3 (such as the high voltage signal) through the heater 130, and the third terminal (such as the source terminal) of the transistor M4 may receive the reference voltage signal V4 (such as the low voltage signal). In some embodiments, the transistor M4 may also be a P-type transistor.

Furthermore, the heater device 200 further includes a logic control circuit 140. The logic control circuit 140 may be electrically connected to the first terminal of the transistor M3 and the first terminal of the transistor M4. In addition, the logic control circuit 140 may control whether to provide the reference voltage signal V1, the reference voltage signal V2, the reference voltage signal V3 and the reference voltage signal V4. In the embodiment, the operation process of the heater device 200 is the same as or similar to the operation process of the heater device 100. Accordingly, the operation process of the heater device 200 may refer to the description of the embodiment of FIG. 1, and the description thereof is not limited thereto.

In the embodiment, the first terminal of the transistor M3 and the first terminal of the transistor M4 are electrically connected to each other and receive the same signal, but the disclosure is not limited thereto. In some embodiments, the first terminal of the transistor M3 and the first terminal of the transistor M4 may be separated and receive different signals, and the same effect as a memory function may also be achieved.

Figure 3:
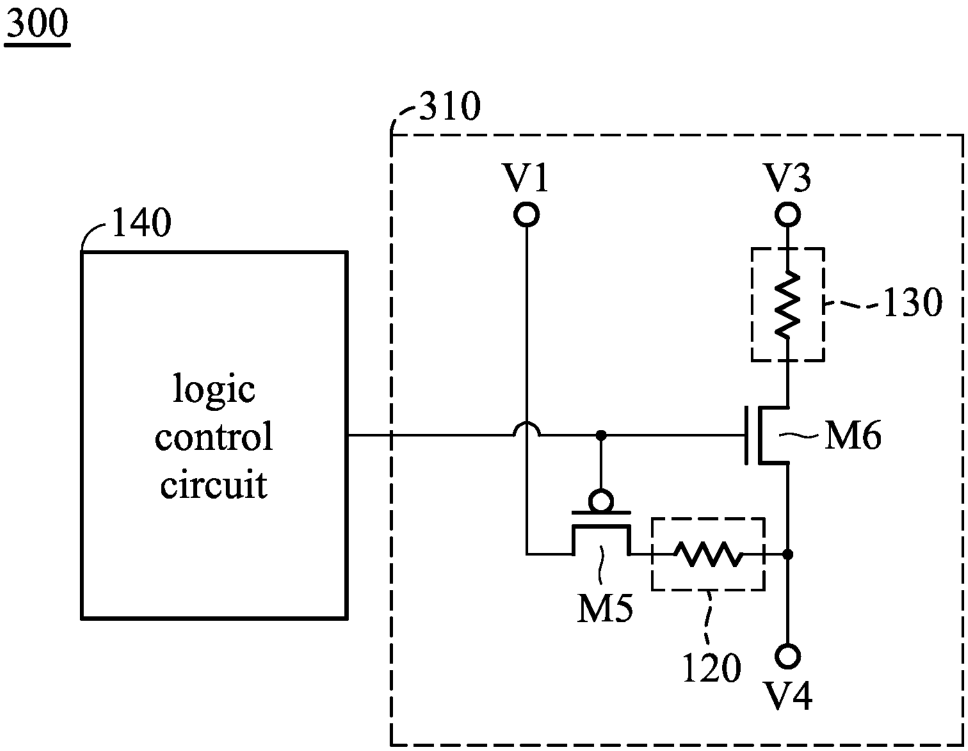
FIG. 3 a schematic view of a heater device with a memory unit according to an embodiment of the disclosure.

FIG. 3 a schematic view of a heater device with a memory unit according to an embodiment of the disclosure. Please refer to FIG. 3. The heater device 300 with the memory unit includes a heater circuit 310, and the heater circuit 310 may at least include a transistor M5, a transistor M6, a memory unit 120 and a heater 130. In the embodiment, the memory unit 120 and heater 130 in FIG. 3 are the same as or similar to the memory unit 120 and the heater 130 in FIG. 1. Accordingly, the memory unit 120 and the heater 130 in FIG. 3 may refer to the description of the embodiment of FIG. 1, and the description thereof is not repeated herein.

The first terminal of the transistor M6 and the first terminal of the transistor M5 may be electrically connected to each other. The memory unit 120 may be electrically connected to a second terminal of the transistor M5 and a third terminal of the transistor M6. The heater 130 may be electrically connected to a second terminal of the transistor M6.

In the embodiment, the transistor M5 is, for example, a P-type transistor, but the disclosure is not limited thereto. The first terminal of the transistor M5 may be a gate terminal, the second terminal of the transistor M5 (i.e., the second terminal of the transistor M5 electrically connected to the memory unit 120) may be a drain terminal, and a third terminal of the transistor M5 may be a source terminal. In addition, the second terminal (such as the drain terminal) of the transistor M5 may receive the reference voltage signal V4 (such as the low voltage signal) through the memory unit 120, and the third terminal (such as the source terminal) of the transistor M5 may receive the reference voltage signal V1 (such as the high voltage signal). In some embodiment, the transistor M5 may also be an N-type transistor.

In the embodiment, the transistor M5 and the transistor M6 may be transistors with different doping types. That is, the transistor M6 is, for example, an N-type transistor, but the disclosure is not limited thereto. The first terminal of the transistor M6 may be a gate terminal, the second terminal of the transistor M6 (i.e., the second terminal of the transistor M6 electrically connected to the heater 130) may be a drain terminal, and a third terminal of the transistor M6 may be a source terminal. In addition, the second terminal (such as the drain terminal) of the transistor M6 may receive the reference voltage signal (such as the high voltage signal) through the heater 130, and the third terminal (such as the source terminal) of the transistor M6 may receive the reference voltage signal V4 (such as the low voltage signal). In the embodiment, the transistor M6 may also be a P-type transistor.

Furthermore, the heater device 300 further includes a logic control circuit 140. The logic control circuit 140 may be electrically connected to the first terminal of the transistor M5 and the first terminal of the transistor M6. In addition, the logic control circuit 140 may control whether to provide the reference voltage signal V1, the reference voltage signal V2, the reference voltage signal V3 and the reference voltage signal V4. In the embodiment, the operation process of the heater device 300 is the same as or similar to the operation process of the heater device 100. Accordingly, the operation process of the heater device 300 may refer to the description of the embodiment of FIG. 1, and the description thereof is not limited thereto.

In the embodiment, the first terminal of the transistor M5 and the first terminal of the transistor M6 are electrically connected to each other and receive the same signal, but the disclosure is not limited thereto. In some embodiments, the first terminal of the transistor M5 and the first terminal of the transistor M6 may be separated and receive different signals, and the same effect as a memory function may also be achieved.

Figure 4:
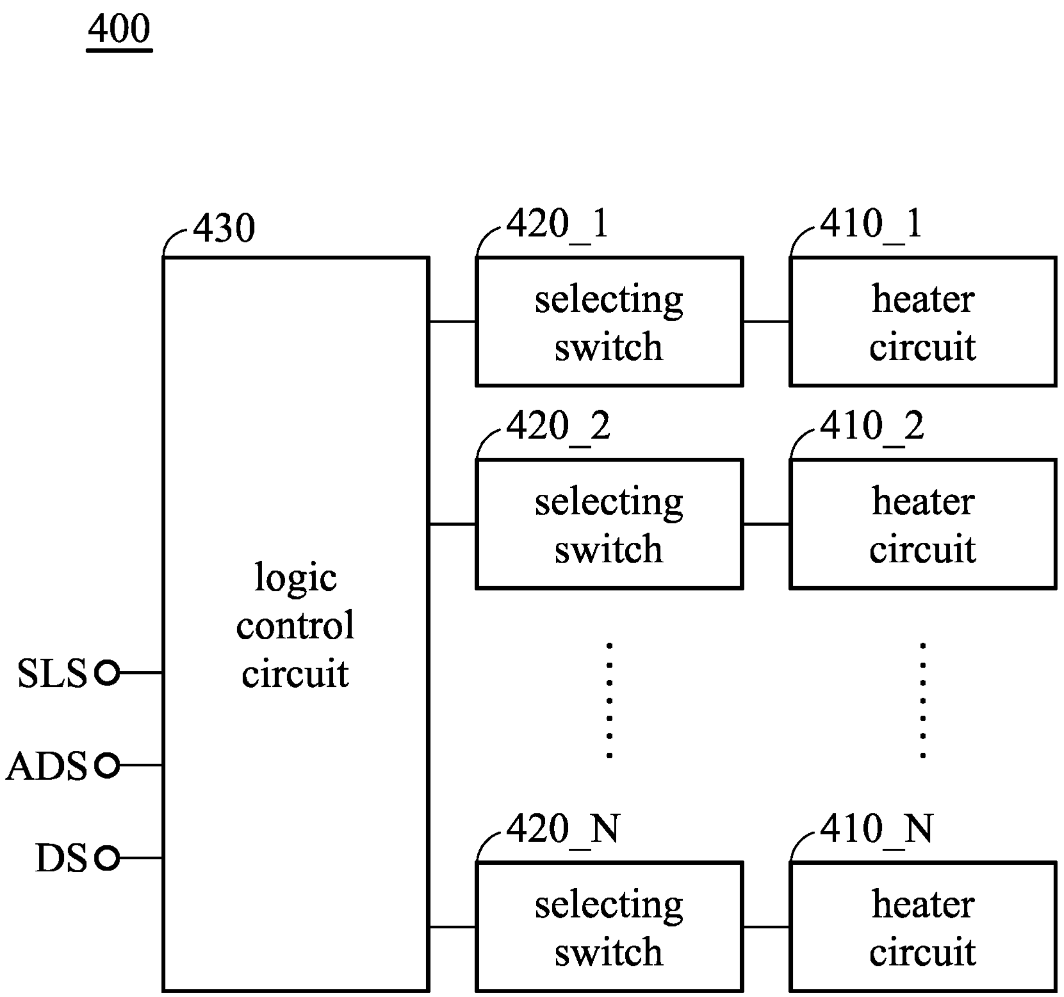
FIG. 4 is a schematic view of a heater device with a memory unit according to an embodiment of the disclosure.

FIG. 4 is a schematic view of a heater device with a memory unit according to an embodiment of the disclosure. Please refer to FIG. 4. The heater device 400 with the memory unit includes a plurality of heater circuits 410_1~410_N, a plurality of selecting switches 420_1~420_N and a logic control circuit 430, wherein N is a positive integer greater than 1. In some embodiments, the heater circuits 410_1~410_N may be the heater circuit 110 of FIG. 1, the heater circuit 210 of FIG. 2, the heater circuit 310 of FIG. 3, or a combination thereof, but the disclosure is not limited thereto. In addition, the internal circuits and the connection relationship thereof of the heater circuits 410_1~410_N may refer to the description of the embodiment of FIG. 1, FIG. 2 or FIG. 3, and the description thereof is not repeated herein.

The selecting switches 420_1~420_N are respectively electrically connected to the heater circuits 410_1~410_N. For example, the selecting switch 420_1 is electrically connected to the heater circuit 410_1, the selecting switch 420_2 is electrically connected to the heater circuit 410_2, . . . , the selecting switch 420_N is electrically connected to the heater circuit 410_N.

The logic control circuit 430 is electrically connected to the heater circuits 410_1~410_N through the selecting switches 420_1~420_N. Furthermore, the logic control circuit 430 may be electrically connected to the first terminals of the first transistors (such as the transistor M1, the transistor M3 or the transistor M5) and the first terminal of the second transistors (such as the transistor M2, the transistor M4 or the transistor M6) of the heater circuits 410_1~410_N. In addition, the heater device 400 may further include a control circuit (not shown) and a power source circuit (not shown). The control circuit may be electrically connected to the terminal of the reference voltage signal V1 and the logic control circuit 430. The power source circuit may be electrically connected to the terminal of the reference voltage signal V2, the terminal of the reference voltage signal V3, the terminal of the reference voltage signal V4 and the control circuit, and the control circuit may control the power source circuit, so that the power source circuit provides the reference voltage signal V2, the reference voltage signal V3 and the reference voltage signal V4. Furthermore, the logic control circuit 430 may receive a selecting signal SLS, an address signal ADS and a data signal, and control the selecting switches 420_1~420_N to turn on or turn off according to the selecting signal SLS, the address signal ADS and the data signal DS, so as to perform the corresponding operation for the heaters 410_1~410_N.

In FIG. 4, the number of the selecting signal SLS, the address signal ADS and the data signal DS is one, but the disclosure is not limited thereto. In some embodiments, the number of the selecting signal SLS, the address signal ADS and the data signal DS may be more than one, and the number of the selecting signal SLS, the address signal ADS and the data signal DS may increase or decrease according to the number of the heater circuits 410_1~410_N, but the disclosure is not limited thereto. That is, when the number of the heater circuits 410_1~410_N increases, the number of the selecting signal SLS, the address signal ADS and the data signal DS may be correspondingly increased. When the number of the heater circuits 410_1~410_N decreases, the number of the selecting signal SLS, the address signal ADS and the data signal DS may be correspondingly decreased.

In the embodiment, the heater device 400 may include a burning mode, a reading mode and a heating mode, but the disclosure is not limited thereto. In the operation of the heater device 400, in the burning mode, the logic control circuit 430 may generate a first signal (such as the high voltage signal or the low voltage signal) to at least one of the heat circuits 410_1~410_N, such as the heater circuit 410_1, according to the selecting signal SLS, the address signal ADS and the data signal DS. Then, the first signal is provided to the first terminal (such as the gate terminal) of the first transistor (such as the transistor M1, the transistor M3 or the transistor M5) to turn on the first transistor (such as the transistor M1, the transistor M3 or the transistor M5) of the heater circuit 410_1, and control circuit may provide the reference voltage signal V1 and control the power source circuit to provide the reference voltage signal V2 or the reference voltage signal V4, so that the current generated by the voltage signals (such as the reference voltage signal V1 and the reference voltage signal, or the reference voltage signal V1 and the reference voltage signal V4) coupled to the two terminals of the first transistor (such as the transistor M1, the transistor M3 or the transistor M5) of the heater circuit 410_1 flows through memory unit 120 of the heater circuit 410_1, so as to perform the burning operation on the memory unit 120 of the heater circuit 410_1. For example, the memory unit 120 of the heater circuit 410_1 is burned to present the open circuit. On the other hand, when the logic control circuit 430 does not generate the first signal (such as the high voltage signal or the low voltage signal) to the heater circuits 410_2~410_N, the transistors (such as the transistors M1, the transistors M3 or the transistors M5) of the heater circuits 410_2~410_N may be turned off, no current flows through the memory units 120 of the heater circuits 410_2~410_N, and the burning operation may be perform on the memory units 120 of the heater circuits 410_2~410_N, so that the memory units 120 of the heater circuits 410_2~410_N present the non-open circuit.

In addition, in the burning mode, the control circuit may also selectively disconnect the voltage signals coupled to the two terminals of the second transistors (such as the transistors M2 or the transistors M4) of the heater circuits 410_1~410_N or the voltage signal coupled to one terminal of the second transistor (such as the transistor M6) of the heater circuits 410_1~410_N. That is, the control circuit may control the power source circuit to stop providing the reference voltage signal V3 and the reference voltage signal V4 or the reference voltage signal V3, so as to reduce the power consumption of the heater device 400.

Then, in the reading mode, the logic control circuit 430 sequentially turns on the first transistors (such as the transistors M1, the transistors M3 or the transistor M5) of the heater circuits 410_1~410_N, so that the control circuit determines the states of the memory units 120 of the heater circuits 410_1~410_N. That is, when the first transistor (such as the transistors M1, the transistors M3 or the transistors) of the heater circuits 410_1~410_N are turned on, and the control circuit may sequentially reads the memory units 120 of the heater circuit 410_1~410_N through the terminal of the reference voltage signal V1 and determine that the states of the memory units 120 of the heater circuits 410_1~410_N are the open circuit or the non-open circuit according to the reading result. In the embodiment, the state of the memory unit 120 of the heater circuit 410_1 is the open circuit, and the states of the memory units 120 of the heater circuits 420_2 to 420_N are the non-open circuit. Accordingly, the reading result of the control circuit is, for example, "01 . . . 1" or "10 . . . 0", and the reading result may be used as an identification code of the inkjet of the printer device, preventing the printer device from downgrading to the old firmware or software, or a batch identification of product parameters. Therefore, the heater device 400 may have the memory function, so as to increase the convenience of use.

In addition, in the reading mode, the control circuit may also selectively disconnect the voltage signals coupled to the two terminals of the second transistors (such as the transistors M2 or the transistors M4) of the heater circuits 410_1~410_N or the voltage signal coupled to one terminal of the second transistor (such as the transistor M6) of the heater circuits 410_1~410_N. That is, the control circuit may control the power source circuit to stop providing the reference voltage signal V3 and the reference voltage signal V4 or the reference voltage signal V3, so as to reduce the power consumption of the heater device 400.

Afterward, in the heating mode, the logic control circuit 430 may generate a second signal (such as the high voltage signal) to at least one of the heater circuits 410_1~410_N, such as the heater circuit 410_1, according to the selecting signal SLS, the address signal ADS and the data signal DS. Then, the second signal is provided to the gate terminal of the second transistor (such as the transistor M2, the transistor M4 or the transistor M6) of the heater circuit 410_1 to turn on the second transistor (such as the transistor M2, the transistor M4 or the transistor M6) of the heater circuit 410_1, and the control circuit may control the power source circuit to provide the reference voltage signal V3 and the reference voltage signal V4, so that the current generated by the voltage signals (such as the reference voltage signal V3 and the reference voltage signal V4) coupled to the two terminals of the second transistor (such as the transistor M2, the transistor M4 or the transistor M6) flows through the heater 130 of the heater circuit 410_1, so that the heater circuit 410_1 performs the heating operation. On the other hand, when the logic control circuit 430 does not generate the second signals (such as the high voltage signals) to the heater circuits 410_2~410_N, the second transistors (such as the transistors M2, the transistors M4 or the transistors M6) of the heater circuits 410_2~410_N may be turned off, no current flows the heaters 130 of the heater circuit 410_2~410_N, and the heater circuits 410_2~410_N may not perform the heating operation.

In addition, in the heating mode, the control circuit may also selectively disconnect the voltage signals coupled to the two terminals of the first transistors (such as the transistors M1 or the transistors M3) of the heater circuits 410_1~410_N or the voltage signal coupled to one terminal of the first transistors (such as the transistors M5) of the heater circuits 410_1~410_N. That is, the control circuit may stop providing the reference voltage signal V1 and control the power source circuit to stop providing the reference voltage signal V2, so as to reduce the power consumption of the heater device 400.

Figure 5:
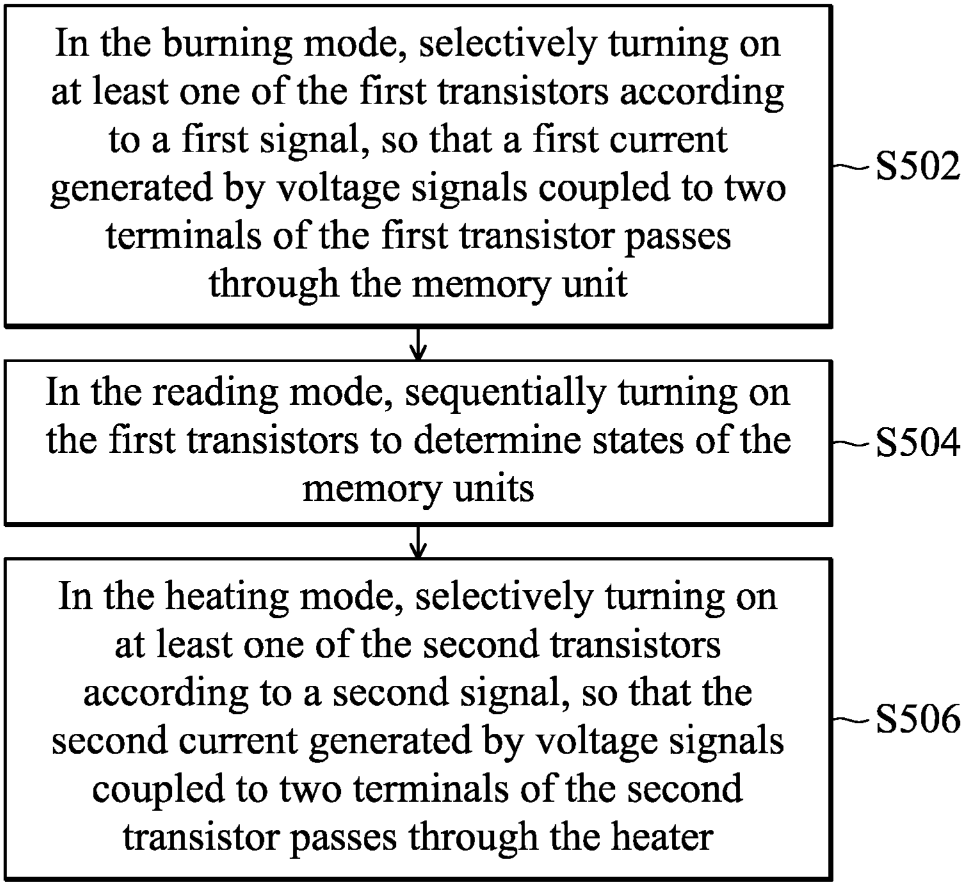
FIG. 5 is a flowchart of an operation method of a heater device with a memory unit according to an embodiment of the disclosure.

FIG. 5 is a flowchart of an operation method of a heater device with a memory unit according to an embodiment of the disclosure. In the embodiment, the heater device has a burning mode, a reading mode and a heating mode. The heater device includes a plurality of heater circuits, and each of the heater circuits includes a first transistor and a second transistor, and a memory unit and a heater respectively electrically connected to the first transistor and the second transistor. In step S502, the method involves in the burning mode, selectively turning on at least one of the first transistors according to a first signal, so that a first current generated by voltage signals coupled to two terminals of the first transistor passes through the memory unit.

In step S504, the method involves in the reading mode, sequentially turning on the first transistors to determine states of the memory units. In step S506, the method involves in the heating mode, selectively turning on at least one of the second transistors according to a second signal, so that the second current generated by voltage signals coupled to two terminals of the second transistor passes through the heater.

Figure 6:
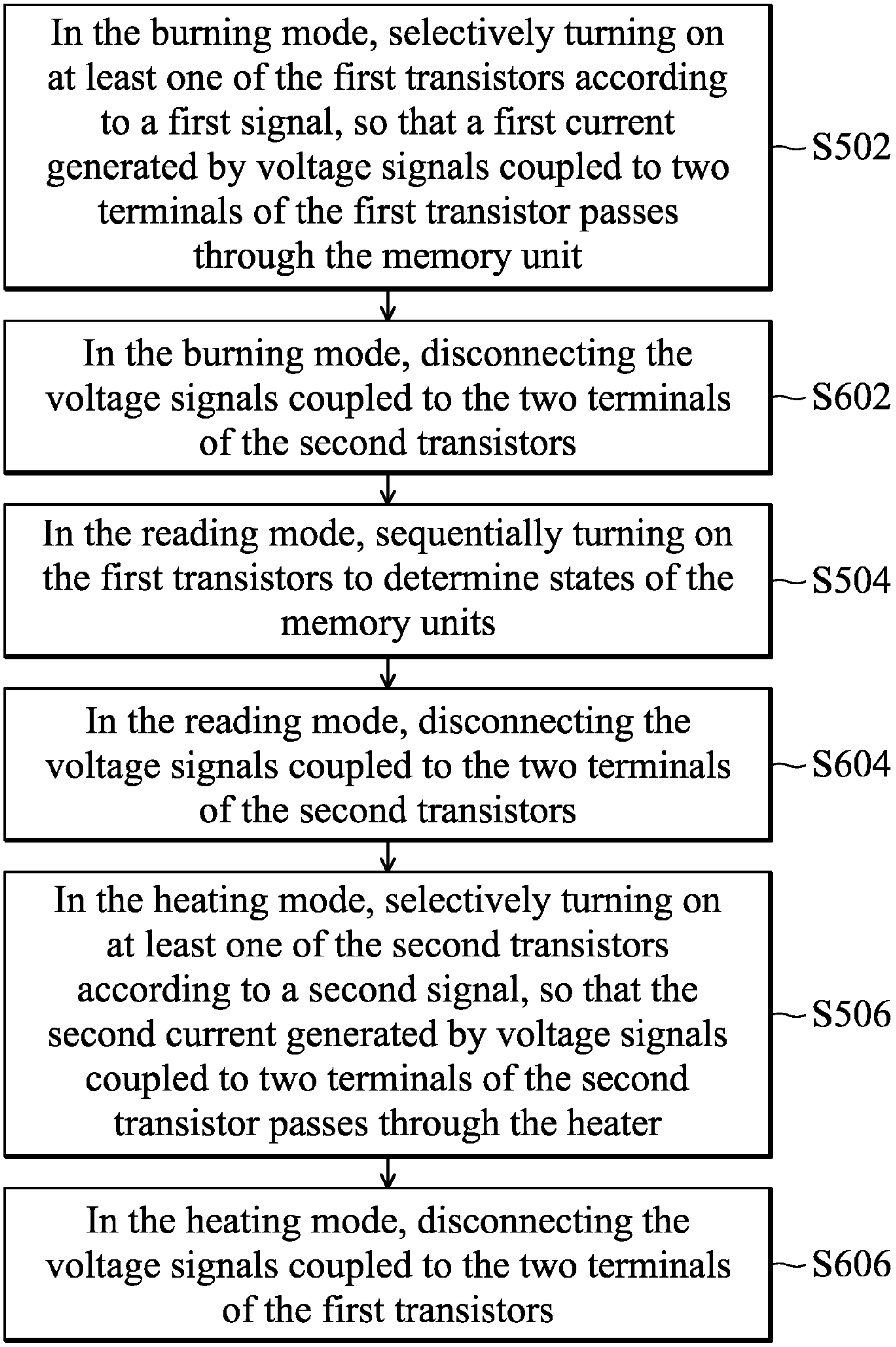
FIG. 6 is a flowchart of an operation method of a heater device with a memory unit according to another embodiment of the disclosure.

FIG. 6 is a flowchart of an operation method of a heater device with a memory unit according to another embodiment of the disclosure. In the embodiment, step S502, step S504 and step S506 in FIG. 6 are the same as or similar to step S502, step S504 and step S506 in FIG. 5. Accordingly, step S502, step S504 and step S506 in FIG. 6 may refer to the description of the embodiment of FIG. 5, and the description thereof is not repeated herein.

In step S602, the method involves in the burning mode, disconnecting the voltage signals coupled to the two terminals of the second transistors. In step S604, the method involves in the reading mode, disconnecting the voltage signals coupled to the two terminals of the second transistors. In step S606, the method involves in the heating mode, disconnecting the voltage signals coupled to the two terminals of the first transistors.

In summary, according to the heater device with a memory unit and the operation method thereof disclosed by the embodiments of the disclosure, the first terminal of the second transistor and the first terminal of the first transistor are electrically connected to each other, the memory unit is electrically connected to the second terminal of the first transistor and the heater is electrically connected to the second terminal of the second transistor. In addition, in the burning mode, the first transistor is turned on according to the first signal, so that the first current generated by the voltage signals coupled to the two terminals of the first transistor passes through the memory unit. In the reading mode, the first transistor is turned on to determine state of the memory unit. In the heating mode, the second transistor is turned on according to the second signal, so that the second current generated by the voltage signals coupled to the two terminals of the second transistor passes through the heater. Therefore, the heater device may have the memory function, reduce the power consumption of the heater device, reduce the used number of signals, reduce the number of pins, or reduce the use area of the circuit, so as to increase the convenience of use.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. A heater device with a memory unit, comprising:

a first transistor;

a second transistor, wherein a first terminal of the second transistor and a first terminal of the first transistor are electrically connected to each other;

a memory unit, electrically connected to a second terminal of the first transistor; and a heater, electrically connected to a second terminal of the second transistor wherein the first transistor is an N-type transistor, and the second terminal of the first transistor electrically connected to the memory unit is a drain terminal.

2. The heater device with the memory unit according to claim 1, wherein the first terminal of the first transistor is a gate terminal, and the first terminal of the second transistor is a gate terminal.

3. The heater device with the memory unit according to claim 1, wherein the first transistor and the second transistor are transistors with the same doping type.

4. The heater device with the memory unit according to claim 1, wherein the memory unit is further electrically connected to a third terminal of the second transistor.

5. The heater device with the memory unit according to claim 1, wherein the memory is a fuse.

6. The heater device with the memory unit according to claim 1, further comprising a logic control circuit, electrically connected to the first terminal of the first transistor and the first terminal of the second transistor.

7. The heater device with the memory unit according to claim 1, wherein the drain terminal of the first transistor receives a high voltage signal through the memory unit, and a source terminal of the first transistor receives a low voltage signal.

8. A heater device with a memory unit, comprising:

a first transistor;

a second transistor, wherein a first terminal of the second transistor and a first terminal of the first transistor are electrically connected to each other;

a memory unit, electrically connected to a second terminal of the first transistor; and a heater, electrically connected to a second terminal of the second transistor;

wherein the first transistor is a P-type transistor, and the second terminal of the first transistor electrically connected to the memory unit is a drain terminal.

9. The heater device with the memory unit according to claim 8, wherein the drain terminal of the first transistor receives a low voltage signal through the memory unit, and a source terminal of the first transistor receives a high voltage signal.

10. A heater device with a memory unit, comprising:

a first transistor;

a second transistor, wherein a first terminal of the second transistor and a first terminal of the first transistor are electrically connected to each other;

a memory unit, electrically connected to a second terminal of the first transistor; and a heater, electrically connected to a second terminal of the second transistor;

wherein the first transistor and the second transistor are transistors with different doping types.

* * * * *